Nov. 5, 1935.  J. H. DENTON  2,019,562

AUTOMOBILE BELL HOUSING SUPPORT

Filed July 6, 1934

Inventor

J. H. Denton

By C. F. Haden

Attorney

Patented Nov. 5, 1935

2,019,562

UNITED STATES PATENT OFFICE 2,019,562

AUTOMOBILE BELL HOUSING SUPPORT

Jesse H. Denton, Meridian, Miss.

Application July 6, 1934, Serial No. 734,030

8 Claims. (Cl. 64—89)

This invention relates to universal joints and more particularly to automobile bell housing supports.

A primary object of the invention is to so construct such a support that the wear on the joint or housing is reduced to a minimum.

Another object is to so construct such a support that the mechanical movement thereof will be free in every direction required.

These and other features of the invention, including new and important details of construction and combination of parts, will be hereinafter more particularly described and claimed.

In the accompanying drawing Figure 1 represents a side elevation of a universal joint for an automobile drive shaft equipped with this improved support;

Figure 1:
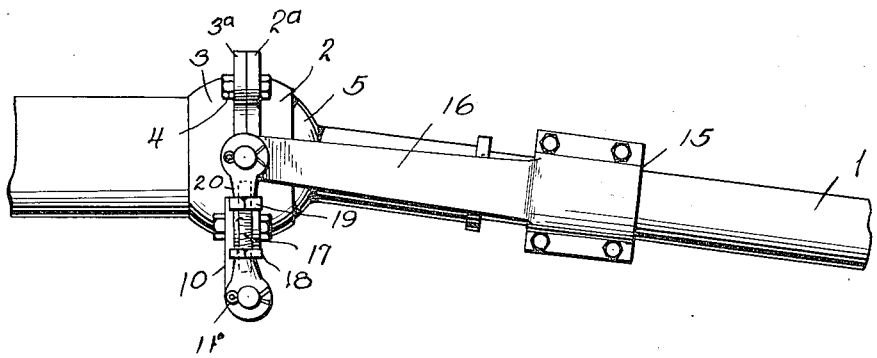
Figure 2:
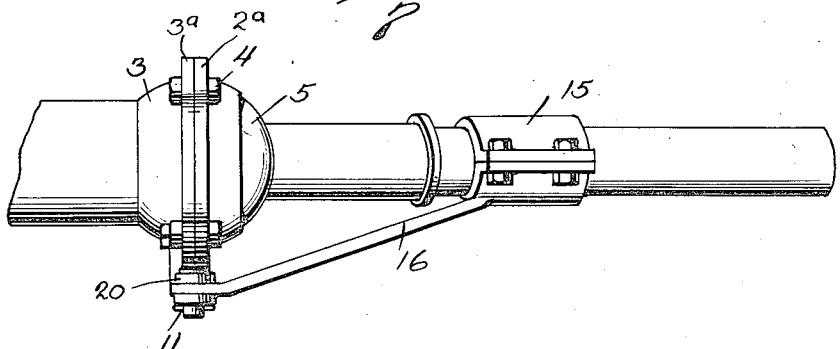
Fig. 2 is a top plan view thereof.
Figure 3:
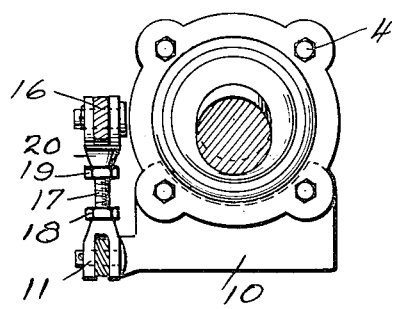
Fig. 3 is a transverse section taken between ball 5 and sleeve 15.

In the embodiment illustrated a drive shaft tube 1 is shown having one member 2 of a universal joint housing engaged with the ball 5 at one end of said tube, said housing member being bolted to the complementary member 3 in the usual manner, each housing member having flanges 2ª and 3ª secured together by bolts 4.

A plate 10 is bolted to the bottom of the universal joint housing to provide a fixed pivot mounting for a knuckle joint 11 to work on.

A sectional sleeve 15 is clamped on the tube 1 and has a longitudinal arm 16 extending forward to the axis of the universal joint housing, which axis is located parallel to the rear axle of the car.

The knuckle joint 11 pivotally mounted on plate 10 and the knuckle joint 20 connected with the free end of arm 16 are connected by a stud 17 having right and left hand threads engaged with said knuckles and these members form a connecting link between arm 16 and the housing carried plate 10, so that by turning said stud in one direction or the other will raise or lower arm 16 and thereby adjust the drive shaft and secure its proper alinement. When proper adjustment is obtained the parts are locked in adjusted position by lock nuts 18 and 19 carried by stud 17 and which act as jambs against the knuckles 11 and 20.

It will thus be seen that the movement of this bell housing support is free in every direction required, the up and down motion of the drive shaft tube 1 caused by the compression of the car springs, is cared for by rotation of arm 16 around the pivot of knuckle 20, while the telescoping action of the drive shaft tube and the bell housing is cared for by the rotation of the connecting link on the pivot of knuckle 11.

I claim as my invention:

1. An automobile bell housing support comprising an arm, means for rigidly securing said arm to the drive shaft tube of an automobile, said arm extending to the axis of the universal joint housing to be supported, a fixed pivot mounting carried by said housing, and an adjustable connection between said arm and said fixed pivot to raise or lower said arm for the adjustment of the drive shaft alinement.

2. An automobile bell housing support comprising an arm, means for rigidly securing said arm to the drive shaft tube of an automobile, said arm extending to the axis of the universal joint housing to be supported, a pivot carried by said arm in alinement with the axis of the joint housing, a fixed pivot spaced from the arm carried pivot, and a connection between said pivots.

3. An automobile bell housing support comprising an arm, means for rigidly securing said arm to the drive shaft tube of an automobile, said arm extending to the axis of the universal joint housing to be supported, a pivot carried by said arm in alinement with the axis of the joint housing, a fixed pivot spaced from the arm carried pivot, and an adjustable connection between said pivots.

4. An automobile bell housing support comprising an arm means for rigidly securing said arm to the drive shaft tube of an automobile, said arm extending to the axis of the universal joint housing to be supported, a pivot carried by said arm in alinement with the axis of the joint housing, a fixed pivot spaced from the arm carried pivot, an adjustable connection between said pivots, and means for locking said connection in adjusted position.

5. An automobile bell housing support comprising an arm, a sleeve for fixing said arm to the drive shaft tube of an automobile, the free end of said arm extending to the axis of the universal joint housing to be supported, a pivot carried by said arm in alinement with the axis of the joint housing, a fixed pivot carried by said housing, knuckle joints mounted on said pivots, and a right and left hand screw stud connecting said knuckle joints.

6. An automobile bell housing support comprising a sleeve to be clamped to the drive shaft tube of an automobile an arm carried by said sleeve and adapted to extend to the axis of the housing to be supported, a pivot carried by said arm in alinement with the axis of the housing, a knuckle joint mounted on said pivot, a plate fixed to said housing, a fixed pivot mounted on said plate, a knuckle joint mounted on the fixed pivot, and a stud adjustably connecting said knuckle joints and operable to raise or lower said arm to adjust the drive shaft and secure its proper alinement.

7. An automobile bell housing support comprising an arm having means for rigidly mounting said arm on an automobile drive shaft tube, and means for connecting said arm with the bell housing to form a housing support free to move in every direction and to adjust the drive shaft and secure its proper alinement.

8. An automobile bell housing support comprising an arm having means for rigidly mounting said arm on an automobile drive shaft tube, said arm adapted to extend parallel with said tube, a fixed pivot mounting carried by said housing, a knuckle pivoted on said mounting, a knuckle pivoted on said arm, and a link connecting said knuckles.

JESSE H. DENTON.